(12) United States Patent
Jerebko et al.

(10) Patent No.: US 8,594,407 B2
(45) Date of Patent: Nov. 26, 2013

(54) PLANE-BY-PLANE ITERATIVE RECONSTRUCTION FOR DIGITAL BREAST TOMOSYNTHESIS

(75) Inventors: Anna Jerebko, Erlangen (DE); Koen Michielsen, Leuven (BE); Johan Nuyts, Heverlee (BE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 13/365,451

(22) Filed: Feb. 3, 2012

(65) Prior Publication Data

US 2013/0202168 A1  Aug. 8, 2013

(51) Int. Cl.
*G06K 9/00* (2006.01)
*A61B 6/00* (2006.01)

(52) U.S. Cl.
USPC ................. 382/131; 378/4; 378/21

(58) Field of Classification Search
USPC ......... 382/128, 129, 130, 131, 132, 133, 134, 382/164; 378/4, 8, 21–27, 101, 901; 600/407, 410, 425, 437; 128/920, 922
See application file for complete search history.

(56) References Cited

U.S. PATENT DOCUMENTS 7,773,721 B2 * 8/2010 Wu et al. ................. 378/21

OTHER PUBLICATIONS

Nystroem, et al: "Long-Term Effects of Mammography Screening: Updated Overview of the Swedish Randomised Trials", The Lancet, vol. 359, Mar. 16, 2022, pp. 909-919.
Nuyts, et al: "Itertive Reconstruction for Helical CT: a Simulation Study", Phy. Med. Biol. 43, 1998, pp. 729-737.
Mertelmeier, et al: "Optimizing Filtered Backprojecktion Reconstruction for Breast Tomosynthesis Prototype Device", Proceedings of SPIE vol. 6142, 2006, pp. 1-12.
Zhang, et al: "A Comparative Study of Limited-Angle Cone-Beam Reconstruction Methods for Breast Tomosynthesis", Med. Phys. 33 (10), Oct. 2006, pp. 3781-3795.
Wu, et al: "A Comparison of Reconstruction Algorithms for Breast Tomosynthesis", Med. Phys. 31 (09), Sep. 2004, pp. 2636-2647.
Van Slambrouck, et al: "A Patchwork (Back) Projektor to Accelerate Artifact Reduction in CT Reconstruction", 2010 IEEE, pp. 2625-2629.
Qi: "A Unified Noise Analysis for Iterative Image Estimation", Phys. Med. Biol. 48, 2003, pp. 3505-3519.
Bird, et al: "Analysis of Cancers Missed at Screening Mammography", Radiology 1992, pp. 613-617.
Park, et al: "Breat Tomosynthesis: Present Considerations and Future Applications", Graphics 2007, vol. 27, Special Issue, pp. 231-240.
Lange, et al: "Globally Convergent Algorithms for Maximum a Posteriori Transmission Tomography", IEEE Transactions on Image Processing, vol. 4, No. 10, Oct. 1995, pp. 1430-1438.
Fessler, et al: "Spatial Resolution Properties of Penalized-Likelihood Image Reconstruction: Space-Invariant Tomographs", IEEE Transactions of Image Processing, vol. 5, No. 9, Sep. 1996, pp. 1346-1358.
Barrett, et al: "Noise Properties of the EM Algorithm: I. Theory", Phys. Med. Biol. 39, 1994, pp. 833-846.
Fessler, et al: "Grouped-Coordinate Ascent Algorithms for Penalized-Likelihood Transmission Image Reconstruction", IEEE Transactions on Medical Imaging, vol. 16, No. 2, Apr. 1997, pp. 166-175.

\* cited by examiner

*Primary Examiner* — Abolfazl Tabatabai
(74) *Attorney, Agent, or Firm* — Laurence A. Greenberg; Werner H. Stemer; Ralph E. Locher

(57) ABSTRACT

A method for digitally reconstructing a 3-dimensional tomosynthesis image by iterative reconstruction, a reconstructor, and a computer program product method are capable of plane-by-plane iterative reconstruction for digital breast tomosynthesis. The reconstruction process is based on a grouped coordinate ascent algorithm where the volume is split into a plurality of patches, wherein all patches are parallel to a surface of a detector. Splitting the volume allows implementing a modified model for image acquisition where the physical movement of the x-ray source is taken into account because each of the patches is updated separately and sequentially. In addition the splitting allows an efficient implementation on a graphical processing unit by reducing memory requirements.

15 Claims, 3 Drawing Sheets

PLANE-BY-PLANE ITERATIVE RECONSTRUCTION FOR DIGITAL BREAST TOMOSYNTHESIS

BACKGROUND OF THE INVENTION

Field of the Invention

The present invention relates to the digital reconstruction of a three-dimensional tomosynthesis image and a graphics processing unit (GPU) which is used to execute a reconstruction process based on a more accurate model of the acquisition process.

Given the fact that breast cancer is one of the most common cancers among women today, early detection of the cancer or other anomalies indicative of cancer, like microcalcifications, so that these may be treated prior to metastatic spread, is an important objective. Accordingly, it is a major task to improve imaging techniques and related systems, as well as methods for reconstruction of tomographical images.

Conventional mammography techniques are based on 2-dimensional imaging and generally suffer from the limitation that 3-dimensional anatomical information (for example masses or other anatomical structures to be detected) is projected onto a 2-dimensional image and therefore overlapping breast tissue often makes it difficult to perceive and characterize subtle lesions. In other cases the superposition of normal tissue structures can resemble suspicious lesions and lead to further, unnecessary medical procedures.

In order to overcome these limitations a 3-dimensional imaging approach has been introduced. This approach analyses direct projections by computer software in order to construct or reconstruct a 3-dimensional volume of the breast, the reconstructed volume. In these systems x-rays are sent by an x-ray source to an x-ray detector. Between the source and the detector the medical volume (for example the breast) is arranged and preferably compressed. The x-ray beam, sent by the x-ray source is attenuated by the volume, so that attenuated signals may be received at the detector or by a set of detector elements, which produce signals, representing the attenuation of the incident x-rays and which are processed in order to reconstruct the 3-dimensional image. Normally the breast is exposed to radiation from a plurality of different angles. For example, a digital breast tomosynthesis system may acquire 25 direct projection images in which the source may move, such that the imaging angle may change within about 50 degrees. Alternate to the moving x-ray source there may be provided several x-ray sources in order to acquire signals from different angles. This 3-dimensional tomosynthesis technique provides spatial differentiation of overlapping tissues while losing some spatial differentiation between in plane adjacent structures, compared to the above-mentioned 2D imaging technique (in the direction perpendicular to the detector).

However, digital breast tomosynthesis suffers from incomplete data (only a range of about 50 degrees is sampled out of the 180 degrees necessary for a complete data set are measured) which causes artifacts and creates the problem that there will be an infinite number of possible reconstruction volumes that can be described by the measured data. Another source of artifacts is introduced when the mathematical acquisition model used in the reconstruction deviates from the physical reality of the acquisition. In addition, a desire to minimize patient exposure to ionizing radiation leads to high noise in the measured data (poor quantum statistics) which is then propagated through the reconstructed volume.

In order to overcome these problems and improve the reconstruction result, several reconstruction algorithms have been suggested in state of the art systems.

Popular filtered backprojection (FBP) reconstruction methods provide high contrast and acceptable detail level in reconstructed images but those methods lose the information about relative tissue density (see for example: Mertelmeier T., Orman J., Haerer W., Kumar M. K., "Optimizing filtered backprojection reconstruction for a breast tomosynthesis proto-type device", Proc. SPIE 6141, 2006). This happens due to removal of low frequency components with some filter kernels. Although these algorithms assume complete and noiseless data, some corrections can be applied to reduce the resulting problems.

So-called iterative reconstruction techniques do not make any assumptions on the measured data. Instead, a mathematical model of the acquisition process is used to define a cost function that needs to be maximized. For example, maximum likelihood methods use the Poisson distribution of the measured data to calculate the statistical likelihood of the projections and use it as a cost function. In the case of perfect data, the reconstructed volume with maximized cost function would be identical to the original image.

Iterative reconstruction techniques repeatedly or iteratively apply an update to the reconstruction volume to generate an image that maximizes the defined cost function. This cost function depends on the model of the measurement (data acquisition), which includes the forward projection. Iterative reconstruction algorithms help to improve image quality, reduce artifacts in reconstructed images and allow reduction of x-ray dose. However, iterative reconstruction algorithms require significantly more computation time than conventional (for example FBP) reconstruction methods, because they have to execute a lot of iterations to generate each image, i.e. to "converge" to a solution. Further, these algorithms typically become computationally intensive and therefore are often impractical for clinical applications, due to the fact that images should be available to the radiologist within a reasonable amount of time.

Iterative reconstruction offer possibilities for improving image quality and reducing artifacts as compared to analytical methods. Artifacts are mostly caused by a discrepancy between the real physical acquisition process and the model of the acquisition process used for reconstruction. Consequently, artifacts may be reduced and thus image quality enhanced by using a better (more accurate) model for image acquisition. Generally, more accurate models will be more complex and will require more processing time and memory.

With respect to the problem of incomplete data and high image noise, application of an iterative reconstruction approach could be beneficial due to the possibility to include prior functions. Generally, these prior functions put additional constraints on the reconstructed volume (for example limiting variance between adjacent voxels in order to reduce noise), thus reducing the number of possible solutions in the case of incomplete data. However, one of the disadvantages of this approach is that it requires empirical determination of the optimal parameters of the prior function which usually involves a grid search over a range of values. The latter is not practical for high resolution breast imaging especially when multiple prior functions are evaluated. Another significant limitation is that iterative reconstruction methods with priors require to keep the multiple versions of the whole volume in memory. The precondition mentioned before (to keep a lot of data in memory) is required for the update step and prior function computation. The latter limits the maximum size of the reconstructed volume to the amount of GPU (graphics processing unit) memory.

OBJECT OF THE INVENTION

Based on the above-mentioned approaches in state of the art it is therefore an object of present invention to provide an iterative reconstruction for digital breast tomosynthesis, which has a faster convergent speed and an efficient memory usage as known algorithms, while using a more accurate (and complex) acquisition model and while assuring efficient noise control and which may be implemented in the graphical processing unit. Moreover, it should be possible to overcome the drawbacks of the present reconstruction algorithms, mentioned above.

SUMMARY OF THE INVENTION

In one aspect the method for digitally and iteratively reconstructing a 3-dimensional tomosynthesis image of a 3-dimensional volume, particularly of an organ and/or a body part/structure, comprises:
  Receiving signals of the tomosynthesis image system, wherein x-ray radiation is sent by an x-ray source to be received at a detector and is attenuated by anatomical structures of the 3-dimensional volume
  Providing a model for image-acquisition, wherein this model can include parameters based on the physical movement of the x-ray source during x-ray emission/radiation and wherein the model could be different for each patch
  Creating a cost function which includes the provided acquisition model. For complete, noiseless data, the cost function should be maximal for the true volume that has been measured on the system. An example is the Poisson likelihood of the acquired data.
  Reconstructing the 3D volume by iteratively updating (changing) the volume so that the cost function is optimized. For example, the update step to maximize the likelihood can be calculated with the MLTR algorithm or the ML-convex algorithm or the ML-gradient algorithm or a grouped coordinate ascent algorithm (wherein the grouped coordinate ascent algorithm is not applied for each patch, it is applied to the entire volume and the patches (groups) are the result) or another algorithm.

A short explanation of terms used within this application is given below.

The x-ray source or tube is adapted to emit x-ray radiation, which is generally directed towards the detector. Typically the x-ray source is rotatable about an axis of rotation in order to image a compressed breast from a plurality of angles. Typically the source may be moved within an interval of 50° on an arc above breast in preconfigurable angular steps (typically: 2° steps between −25° to 25°). During x-ray exposure breast and detector remain stationary or static, respectively. Alternatively, it is also possible to provide not one single x-ray source, but a plurality of x-ray sources positioned at different locations, which may be arranged on an arc and/or which may be activated according to a preconfigurable (time) pattern:

The detector usually is a flat panel detector. The detector may consist of a plurality of detector fields. The detector is a digital detector. The detector might also be combined with at least one plate of the compression system or with a compression paddle.

The 3-dimensional volume mainly refers to a medical volume to be examined. According to a preferred embodiment the invention is applied for tomosynthesis mammography. However, the invention might also be applied for a variety of 3-dimensional imaging situations, such as heart imaging, bone imaging or generally examinations of soft tissues. Other embodiments do not refer to report generation or diagnosis, but refer to surgical applications like implantations, also comprising orthopedic implants, heart implants etc.

The 3-dimensional volume, for example the breast, consists of a plurality of different tissue structures with a different density, for example fat tissue, glandular tissue, muscle, ligaments, blood vessels or other tissues, which also differ in their attenuation factors. Therefore, microcalcifications, lesions or other anatomical modifications or anatomical structures superimposing other structures are also detectable in the reconstructed image.

"Reconstructing" refers to an iterative method where the 3D volume is modified in several steps in order to maximize a cost function. In one aspect of the invention parts of the volume (a patch, or a plane in the volume to be reconstructed) are updated sequentially within one update iteration of the entire volume. After a patch has been updated, its new values will be used when updating the other patches. Therefore, the'order of updating matters and the logic of the algorithm is based on a sequential updating scheme. Thus, update steps are calculated for one patch and then applied to the reconstruction volume. After this update (and taking into account the changes that are introduced by this update) the update step for the next patch is calculated and applied to the image patch-by-patch. Reconstructing may comprise displaying the reconstructed volume on a monitor or output device.

The term "iterative" refers to the fact that the algorithm starts from an initial image for which the cost function is calculated. In each following step, the update algorithm determines the necessary change to the volume (the update step) which will increase the cost function. Because of the complex mathematical form of the cost function, it is impossible to find an update step which maximizes the cost function in one step. The algorithm is thus repeated until a certain stopping condition is met (for example after a fixed number of iterations, or after a certain noise level has been reached in the volume). After each step the cost function calculated from the current volume will be higher than in the previous iteration, and thus closer to its maximum value.

According to one aspect, the invention provides a method that enables to the use of a digital tomosynthesis to efficiently provide accurate 3-dimensional imaging of a target object, like a breast. Particularly, the method allows including a more accurate model of the acquisition process into the cost function of a maximum-likelihood for transmission algorithm (MLTR), in addition, the convergence speed of the algorithm is increased by applying a grouped coordinate ascent algorithm, where groups of voxels (as volume segments) are updated sequentially instead of simultaneously. This allows an efficient implementation on a graphical processing unit by reducing memory requirements.

The "model" is a mathematical abstraction of the physical image acquisition process which is used during image calculation and reconstruction. Accordingly, the model is based on positional data relevant to the physical acquisition process and/or relates to real physical acquisition parameters, like image acquisition geometry, movement of x-ray source and/or x-ray detector during exposure, acquisition angles, radiation dose, detector properties, and image-related parameters, like spatial resolution and contrast resolution etc. A model may be formatted in a mathematical or abstract denomination or language. Based on the model there are deducible instructions relating to image reconstruction, which also might be implemented in hardware or software. The model is a representation of the physical acquisition process and serves as input data or basis for the reconstruction process, implemented on a system or on a reconstructor.

The model processed and used within an embodiment of this invention is based on the main acquisition assumptions as in regular MLTR. It is assumed that the transmission data are Poisson-distributed. In contrast to a regular MLTR algorithm (see below) it is assumed that the x-ray tube moves during exposure: the acquisition model is changed from a "step and shoot model" to a model where the focus of the x-ray tube is moving during x-ray exposure. That is to say in original state of the art systems a model for the acquisition process has been based on the fact that the focus of the x-ray tube was stationary during each detector exposure and then moved to the next acquisition angle. In contrast to this in the model of the present invention the focus of the x-ray tube is also moving during x-ray exposure, and thus is better (more accurate) adapted to the real physical acquisition situation. This fact can be modeled as a smoothing of the transmission data provided that the volume has been split in patches parallel to the detector surface.

In the most simple case the acquisition model can be written as $\hat{y}_i = b_i \exp(-\Sigma_j l_{ij} \mu_j)$ with $\hat{y}_i$ the result of the modelled measurement, $\bar{\mu}$ the attenuation distribution (the 3D volume to be reconstructed, $b_i$ the blank value for projection line i (the theoretical measurement value in the case where there is no attenuation measured) and $l_{ij}$ the intersection length between projection line i and voxel j.

An example for including tube motion in the data acquisition model is shown here. The physical reality is closely described by the following formula:

$$\hat{y}_i = \sum_x b_x \prod_p \exp\left(-\sum_{j \in p} l_{i_x j} \mu_j\right) + s_i$$

With $\hat{Y}_i$ the measured data with pixel index i, with x defining the tube positions within a single x-ray exposure, with p enumerating the planes in the reconstruction volume, with \mu_j the attenuation value in voxel j of the reconstruction volume, with b_x the number of x-ray photons emitted by the x-ray tube at position x, with l_ixj the intersection length for the x-ray passing between the x-ray tube at position x, voxel j and pixel i and S_i the scatter in pixel i.

Although this is a good description of reality, this model result in a cost function for which the derived update step is too complex for practical implementation. To this end, we simplify this model to the following model:

$\hat{y}_i = b_i \psi_i + S_i$ $\psi_i = \Pi_p \bar{\psi}_i^p$ $\bar{\psi}_i^p = \Sigma_n PSP_{in}^p \cdot \psi_i^p$ $\psi_i^p = \exp(-\Sigma_{j \in p} l_{ij} \mu_j)$, With PSF in the above mentioned formula referring to a point spread function which is the mathematical description of the image blurring caused by the tube motion.

These two models are mathematically different, but result in similar results. The second model however results in a cost function for which the calculated update step is simple enough for easy implementation.

Starting from the model for the data acquisition, on can define a cost function. This cost function should be defined in such way that the attenuation $\bar{\mu}$ (which enters the cost function through the acquisition model) which maximizes the cost function (or in other embodiments minimizes it, but this is a trivial change of sign) is the "true" attenuation distribution of the volume in the case of complete (180° angular sampling) and noiseless data.

In maximum likelihood algorithms, the log-likelihood L (usually named likelihood instead of log-likelihood) is chosen as cost function. It can be written as $L = \Sigma_i y_i \ln(\hat{y}_i) - \hat{y}_i$, where it both includes the measured data ($y_i$) and the data acquisition model ($\hat{y}_i$).

From the previous section one can see that the image is reconstructed based on information from both the acquisition model and the acquired data. However, in some situations there might be additional information and/or constraints that should be included in the reconstruction. In this situation one can include this information/restraint in the form of a prior function which is added to the cost function discussed in the previous paragraphs.

These prior functions can for example include information on the expected attenuation values in the reconstructed volume, or put a limitation on the maximum variance between neighboring voxels in the reconstruction volume. Starting from the likelihood cost function mentioned above, the new cost function F then becomes $F = L - \beta P$, with P the prior function and $\beta$ the relative weight that is attributed to the prior function relative to the likelihood. In the case of a noise reducing prior, higher $\beta$ will result in a smoother (less noisy image). When $\beta = 0$, the additional information/constraints from the prior are not taken into account for the reconstruction. The prior function can contain numerous other parameters that describe its exact mathematical behavior in the reconstruction algorithm.

An additional useful effect of the prior function in the specific case of tomosynthesis is the fact that usually the cost function for tomosynthesis is not convex, and the following maximization algorithms will only converge to the local maximum and not the maximum of the entire function. Adding a convex prior can limit the total number of local maxima so that the following algorithms are more likely to find the global maximum.

The actual reconstruction of the 3D volume occurs when maximizing the cost function by iteratively updating the volume.

Because of the mathematical complexity of the cost functions it is not possible to calculate the volume for which the cost function is maximized in one step. To this end several iterative algorithms exist that update the volume in several steps in order to maximize the cost function. The key is to step sufficiently fast (otherwise too many iterations are needed to reach the top), but not too fast (otherwise one may step over the top so that the next step has to undo part of the current step). The simplest example is the gradient ascent algorithm, where in each iteration a step is taken in the direction of the largest gradient. This algorithm is inefficient and thus not often used.

Another approach is Newton's method, where a quadratic approximation of the cost function is calculated, and this quadratic function is maximized. The quadratic approximation is then repeated for the updated value of the cost function until a certain stop condition.

For example in the MLTR algorithm, log-likelihood L is maximized by changing the attenuation distribution $\bar{\mu}$. The likelihood can be written as $L = \Sigma_i y_i \ln(\hat{y}_i) - \hat{y}_i$, with $y_i$ the measured transmission scan and $\hat{y}_i$ the estimated transmission scan. In the most simple case the acquisition process can be written as $\hat{y}_i = b_i \exp(-\rho_i l_{ij} \mu_j)$ with $b_i$ the blank value for projection line i and $l_{ij}$ the intersection length between projection line i and voxel j. With this information, one can construct a gradient ascent algorithm. In a more general form, including an additional weighting factor α and prior P($\bar{\mu}$) with weight β, the update step derived with Newton's method can be written as:

$$\mu_j^{n+1} = \mu_j^n + \frac{\sum_i l_{ij}(y_i - \hat{y}_i) - \beta \sum_k w_{jk} \frac{\partial P(\mu_j, \mu_k)}{\partial \mu_j}}{\frac{1}{\alpha_j} \sum_i l_{ij} \hat{y}_i \sum_h l_{ih} \alpha_h - 2\beta \sum_k w_{jk} \frac{\partial^2 p(\mu_j, \mu_k)}{\partial \mu_j^2}}.$$

It is assumed that the prior P($\bar{\mu}$) is convex and can be written as P($\bar{\mu}$)=$\Sigma_{jk}$P($\mu_j$, $\mu_k$). Choosing $\alpha_j$=1 in the equation above gives the update step for the MLTR algorithm.

The MLTR-algorithm is described in more detail in Nuyts J., Man B. De, Dupont P. et al.; "Iterative reconstruction for helical CT: A simulation study", Physics in Medicine and Biology, 1998; 43(4): 729-737. A similar update step can be derived for different cost functions.

Another approach is to construct a surrogate function of the cost function. In this situation the surrogate function is an approximation of the cost function that is mathematically easier to maximize. An example is Lange's ML convex algorithm (Lange K, Fessler J A., "Globally convergent algorithms for maximum a posteriori transmission tomography", IEEE Transactions on Image Processing. 1995; 4(10):1430-1438.)

By choosing $\alpha_j$=$\mu_j$+ε with ε>0 in the update step above, an algorithm with characteristics from both the MLTR and Convex algorithm is obtained.

The approaches mentioned above will update the entire volume in one step in one iteration. This general approach limits the convergence speed of the algorithm: generally the more voxels are updated in one iteration, the smaller the update steps can be.

An alternative approach is to update only a subset of all voxels during one subiteration, with several subiterations for which all voxels are updates are considered one full iteration. This approach is a grouped coordinate ascent algorithm originally described by Fessler J. A. (see: Fessler, E. P. Ficaro, N. H. Clinthorne, and K. Lange, "Grouped-coordinate ascent algorithms for penalized-likelihood transmission image reconstruction.," IEEE Transactions on Medical Imaging, vol. 16, no. 2, pp. 166-175, April 1997).

The grouped coordinate ascent algorithm essentially "splits" the volume in a plurality of subvolumes, the 'groups' in the algorithm, here referred to as patches. A patch, therefore, comprises a plurality of voxels and refers to a subvolume. The exact choice of these patches has a definite influence on the size of the update steps and is dependent on the geometry of the image acquisition.

According to the invention the peculiar geometry of the tomosynthesis acquisition makes that one specific choice of groups/patches (the patches being parallel to the detector surface) are nearly optimal in a mathematical sense. Based on the specific segmentation or partialization of the volume it is possible to optimize the sequential updating strategy for tomosynthesis.

For the tomosynthesis geometry one method of splitting the reconstruction volume is close to optimal with respect to the resulting update steps in the maximization of the cost function. This optimal choice is selecting each slice parallel to the detector as a single patch. The number of slices in a single patch is preconfigured and might be configurable before reconstruction. Thus, splitting refers to dividing the image into regions, called patches, the patches being updated separately and sequentially. According to an aspect of present invention a patch refers to one layer or plane within the volume. Generally, the following rule holds: the thinner the patches (less volume slices in one patch), the larger the step size can be, and the faster the convergence. Therefore, the slice-by-slice patches are close to optimal for this kind of approach.

In iteration N of the volume, after the attenuation values of the voxels in a $x^{th}$ patch P are updated to new values, these values are immediately applied to the full volume, so that this now consists of patches P that have been updates N−1 times, and patches P that have been updated N times. Iteration N+1 of the algorithm starts when each patch P has received its $N^{th}$ update.

Since each patch is now updated separately, it is much easier to apply different reconstruction models for each of the patches P. For example patch $P_k$ may be reconstructed with other reconstruction model than patch $P_n$. This is theoretically possible while updating the entire volume in one step, but this will results in a very complex and inefficient update step. Van Slambrouck (see: K. Van Slambrouck and J. Nuyts, "A patchwork (back)projector to accelerate artifact reduction in CT reconstruction," in IEEE Nuclear Science Symposium Conference Record, 2010, no. 60819) used the patches to introduce different (spectral) acquisition models in different parts of the reconstruction volume.

In this case the specific choice of the patches as groups in the grouped coordinate ascent algorithm enables an efficient implementation of the acquisition model which takes into account the tube motion as a patch dependent model and will result in less blurring due to the motion of the x-ray tube in the final reconstructed image.

In addition to allowing different acquisition models in different patches, the size of the update steps calculated for this specific choice of the patches as groups in the grouped coordinate ascent algorithm are mathematically close to maximal. Part of this increased convergence comes from the sequential updates but most of the increased convergence is due to an increased step size in the update. This can be seen by considering the update formula shown above (page 14). In this formula, a patch update can be considered as an update with $\alpha_j$=0 everywhere except in the current patch.

Therefore the sum $\Sigma_h l_{ih} \alpha_h$ in the denominator will be smaller and the step size for updates will be larger for smaller patches. Choosing patches as slices parallel to the detector will cause this sum to be as small as possible for as many of the detector positions i as possible.

Given the fact that the proposed process or method does not require the entire reconstruction volume to be in memory, a significant advantage of present invention is therefore to be seen in that implementation of this method is possible on graphics processing unit (GPU), where memory is the main restraint. This also is a major advantage over present prior art systems.

Given the fact that the basic concept of the present invention is based on providing patches parallel to the detector for the volume to be reconstructed the method may also be named patchwork reconstruction. Since using the patchwork reconstruction changes the denominator in the update formula substantially, using the same β value will result in a different amount of smoothing, when compared to a non-patched reconstruction. Therefore, β is adjusted so that resulting images look similar after a preselected or pre-configurable number of iterations.

When using different acquisition models for the different patches, noise will be different for each patch, therefore β will need to be different for each patch so that the resulting noise will be the same in each patch.

The number of iterations and prior function parameters could be computed or calculated, or adjusted respectively with an interactive adjustment, by an automatic adjustment or by calculating noise, which will be described below in more detail. In the following delta refers to a parameter in one embodiment of the prior where it defines the border between voxel variations which can be considered noise and voxel variations which describe real differences in attenuation.

Interactive Adjustment:

The number of iterations could be preselected by a user (radiologist) on a training set of patient images such that all clinical significant features (micro-calcifications, lesions, Cooper's ligaments, etc.) are imaged with sufficient contrast. The parameters of the prior function, like beta, are then calculated such that at the faintest visible clinically significant edges and microcalcifications with gradient G are preserved. The gradient below the determined value G would be considered as noise and smoothed out. That gives the "upper limit" estimate for the delta which determines the gradient range on which the prior works. The prior function parameters delta and the strength of the prior $\beta$ could be adjusted to the preferences of the user in a second, interactive step. Such a method allows a better prediction at early iterations without requiring the full convergence.

Automatic Adjustment:

According to another aspect for adjusting the parameters the prior function parameters are adjusted by maximizing the contrast and edge sharpness in a set of reconstructed clinical features such as micro-calcifications masses and mass speculations. A reference reconstruction method (for example filtered backprojection or an iterative reconstruction method with a large number of iterations to ensure visualization of all clinically relevant feature) is used to reconstruct a set of patient images. A user could manually outline or segment clinically significant features in each reconstructed patient image. The number of iterations is then chosen such that the contrast of the faintest clinical features is sufficiently high for human observer (reference values could be obtained by experiments with phantoms in experiments) or such that the change of clinical feature contrast in each subsequent iteration is lower than a predefined threshold. Then the "upper limit" estimate for the delta and beta is computed such that the faintest edges in the training set of manually outlined clinical features are preserved. An interactive final step could be used for the fine adjustment of prior function parameters to the preferences of the user.

Noise Calculation:

In a further alternative embodiment it is possible to calculate noise at each iteration in function of beta and delta, by using the method described by Qi (J. Qi, "A unified noise analysis for iterative image estimation.," *Physics in Medicine and Biology*, vol. 48, no. 21, pp. 3505-19, November 2003.).

This formula can then be reversed to determine the required beta and delta to attain the desired noise level in the reconstruction.

Generally, the patchwork algorithm tends to accumulate all low frequency information in the first patch $P_1$. To ensure that low frequency information will be uniformly distributed over all patches P, the volume is initialized with an estimate of the mean attenuation and weighted updates are used during the first few iterations.

For example: The updates are weighted by 1/N with N the remaining number of patches P including the current one. Thus, the first update in a case with 10 patches P will have a weight of 1/10, the second update has a weight of 1/9 down to the last update with a weight of 1. In addition, in iteration 2 the patches P are updated from plane (patch) N down to plane 1, while in all other iterations, the updates go up from plane 1 to plane N. Using two iterations with weighted updates provides some robustness against suboptimal initializations and is probably necessary when initializing clinical images with a constant attenuation.

According to another embodiment of present invention a backprojection or a filtered backprojection (FBP) is used as initialization. The weighted updates might or might not be used in this case.

According to a preferred embodiment of present invention reconstructing comprises displaying the reconstructed 3-dimensional image. Obviously, the reconstructed image may be transferred to other computational processing units or workstations in order to be processed or displayed. Preferably the reconstructed image will be stored in a memory or buffer.

Another solution of the above-mentioned object is to be seen in a system according to the claims. The system or reconstructor preferably is part of an embedded system, which could be implemented as a hardware unit, for example in an embedded processor or in a microprocessing unit. This processing unit may be part of the graphics processing unit and preferably consists of a receiver, a model generator, a reconstructor, a storage unit (and an assembler). Other embodiments of the for inputting and outputting image data.

Another solution is to be seen in a computer program product. The product is loaded or may be loaded into a memory or into the graphics processing unit of a computer, with computer readable instructions for execution of a method mentioned above, if the instructions are executed on the computer or directly in the graphics processing unit. Another solution relates to the computer program. The computer program may be stored on a storage medium or may be transferred over a network, such as the internet or other wide or local area networks.

The present invention generally leads to a number of major advantages over prior art systems. Results show, that the convergence speed is faster. Further, memory requirements are lower compared to prior art systems. Moreover, efficient noise control is possible, while boundaries and edges are preserved.

In the following the invention is described with respect to the Figures, showing exemplary embodiments of present invention.

BRIEF DESCRIPTION OF THE DRAWINGS

The invention will be more fully understood from the following detailed description taken in conjunction with the accompanying drawings.

DETAILED DESCRIPTION OF THE INVENTION

Figure 1:
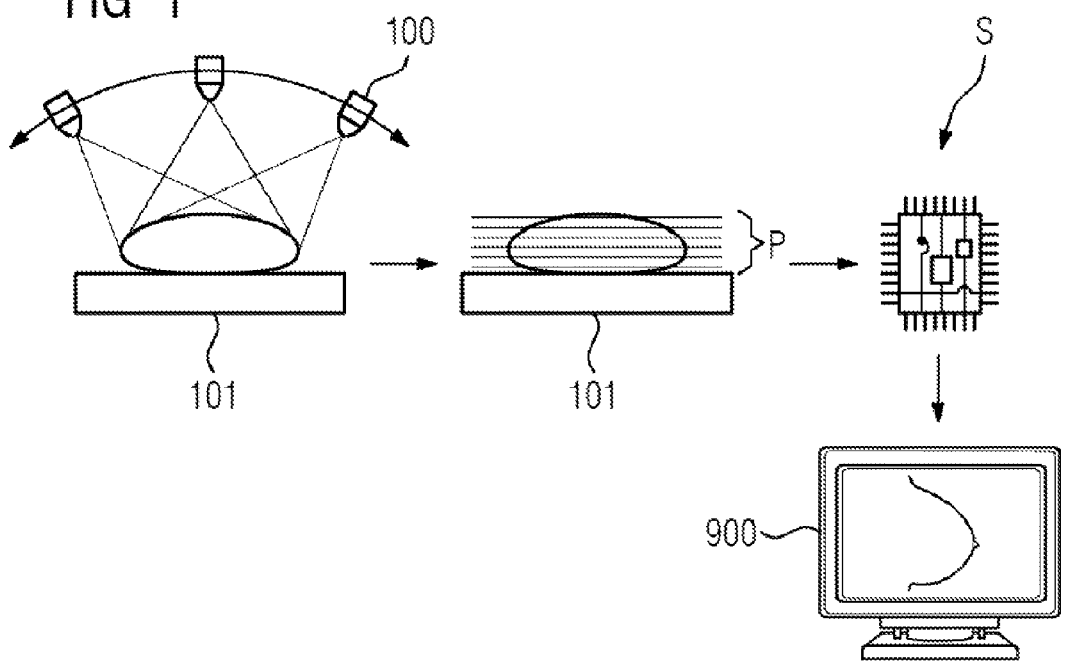
FIG. 1 a schematic overview of our tomosynthesis reconstruction of a medical volume to be displayed on a monitor.

FIG. 1 illustrates a radiographic imaging system in accordance with some embodiments of present invention. The system comprises an x-ray source arrangement. This x-ray source arrangement may itself comprise a plurality of x-ray tubes 100 which are adapted to emit x-ray radiation. Further, the system comprises an x-ray detector 101, which may be implemented as a digital flat panel detector. The medical volume to be reconstructed is depicted in FIG. 1 as a schematic representation, shown as an oval. During computed tomography the x-ray source or tube generates and directs an x-ray beam towards the patient, while the detector measures the x-ray absorbtion at a plurality of transmission paths defined by the x-ray beam during the acquisition process. The detector 101 produces a voltage proportional to the intensity of incident x-rays. The voltage is read and digitized for subsequent processing in a computer 200. During image acquisition huge amounts of data are thus accumulated. For the purpose of image reconstruction the accumulated data are later on analyzed and processed for image reconstruction.

According to one aspect of present invention the volume to be reconstructed is divided or split into a plurality of patches or slices, which in FIG. 1 are referenced by the reference numeral P. The patches P are parallel to a surface of the detector 101.

In the algorithm to maximize the cost function (the reconstruction algorithm), within one iteration of this algorithm, the calculated update step for each patch P of the plurality of patches is applied to the patch before calculating the update step for the next patch. All the patches P of the plurality of patches are thus updated separately and sequentially within each iteration of the reconstruction algorithm. The reconstruction process is executed by performing a plurality of different algorithms, which may be implemented in software and/or in hardware by means of a system S. The system S may be implemented on a microprocessor unit, for example in the graphics processing unit GPU of the computer 200. After having reconstructed all patches P of the volume a 3-dimensional image of the volume to be reconstructed may be calculated and displayed on a monitor 900.

According to the invention a more accurate model of the acquisition process is included in the cost function, for example the likelihood for a maximum-likelihood for transmission (MLTR) algorithm. A possible embodiment of this more accurate model takes into account that the x-ray tube 100 is moving during the x-ray exposure. The convergence speed of the algorithm used for reconstruction is accelerated by applying a grouped coordinate ascent (GCA) algorithm. The groups in the grouped coordinate ascent algorithm are defined by the patches P in which the volume to be reconstructed has been split. These patches (or groups of Voxels) are updated sequentially (instead of simultaneously as known from state of the art algorithms).

Figure 2:
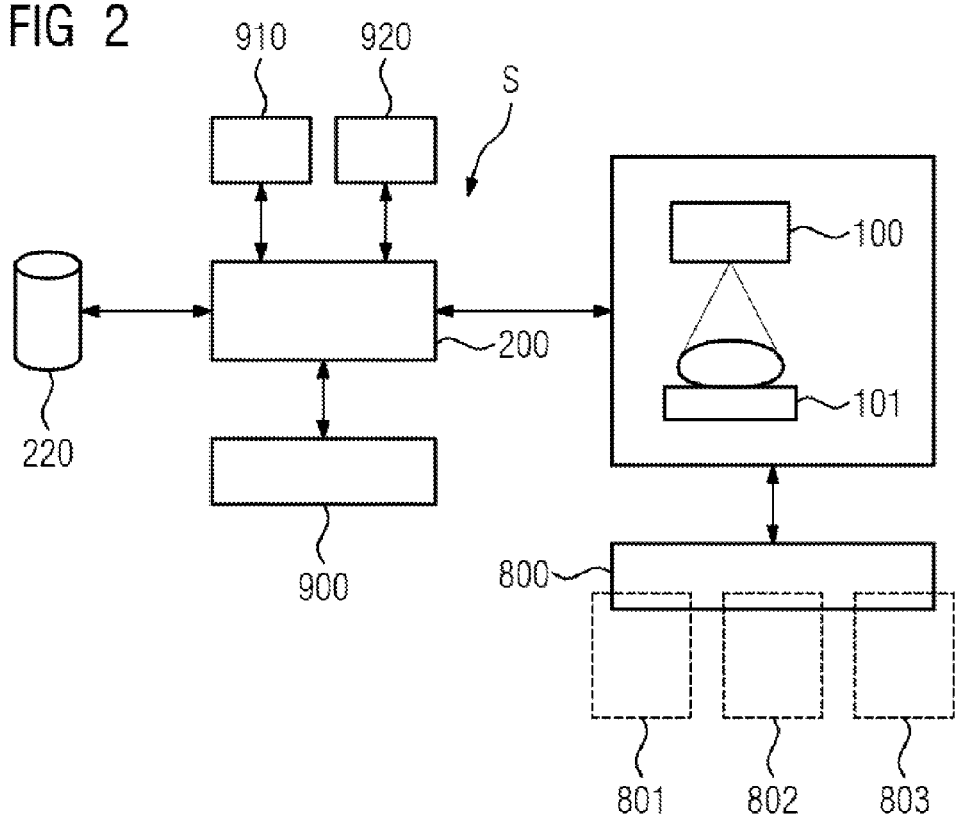
FIG. 2 a schematic overview of components of a reconstruction system according to the invention.

FIG. 2 shows a microprocessor implementation of the reconstruction algorithm by means of a system S in a schematic overview. The image acquisition system is depicted in inner rectangle shown the upper right-hand side of FIG. 2, comprising x-ray tube 100 and x-ray-detector 101. The acquisition system is in data exchange with the computer 200, used for image reconstruction. The computek 200 communicates with the monitor 900, in order to display the reconstructed 3-dimensional image. The computer 200 may also communicate with a printer 910, a further workstation 920 and a separate memory unit 220. The image acquisition system is in data exchange with a controller 800 or a controlling unit 800. The controller 800 itself comprises a source/tube controller 801, a detector controller 802 and an acquisition controller 803.

For a person skilled in the art the image acquisition system may comprise further models or elements, like a collimator, which may configure or define the size and shape of the x-ray beam that emerges from the x-ray tube 100.

The models or instances of the reconstruction system S, mentioned above with respect to the description of the embodiment, depicted in FIG. 2 may communicate over a protocol or a bus system of a signal processing circuitry, which typically is based on a general purpose or an application specific digital computer. The computer may execute routines and instructions, mentioned with respect of the reconstruction process of present invention. The source controller 801 may be adapted to position the x-ray source 100 relative to a patient or a patient's body part and/or relative to the detector 101. The detector controller 802 is adapted to control the detection process of the signals received by the detector unit 101. The detector controller 802 may execute various signal processing and filtration functions, for example initial adjustments of dynamic ranges of detection parameters or for interleaving of digital image data etc.

Typically, the controller 800 is coupled to the computer 200 (not shown in FIG. 2). The acquisition controller 803 usually comprises a converter, in order to receive and sample analogue signals, detected from the detector and converse the data to digital signals for subsequent processing by the computer 200 (particularly for the reconstruction process). The data, being collected during x-ray exposure may be transmitted to the computer 200 and forwarded to memory 220. Alternatively, memory 220 may also be directly implemented on the computer 200.

The monitor 900 or display unit 900 is also coupled to the computer 200 and is adapted to display the reconstructed 3-dimensional image and to control the displaying process. In this respect it should be noted that the computer 200 may also be coupled to other devices or processing circuitries.

Figure 4:
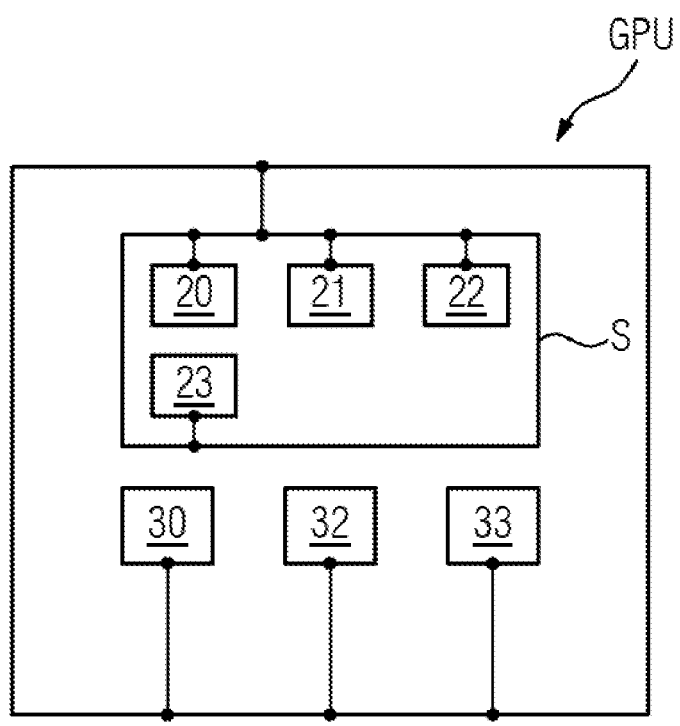

With respect to FIG. 4 a more detailed explanation of the reconstruction system S is given, which is implemented on the graphics processing unit GPU.

The system S comprises:
a receiver 20,
a model generator 21,
a reconstuctor 22,
a storage unit 23.

According to a preferred embodiment the graphics processing unit GPU may also consist of a compressor 30, of a rendering unit 32 and/or of a control unit 33.

The receiver 20 of the system S is adapted for receiving digital signals of the tomosynthesis image system, wherein x-ray radiation is sent by an x-ray source 100 to be received at a detector 101 and which is attenuated by structures of the 3-dimensional volume (patient body part). As already mentioned above, the receiver 200 may also comprise a converter and additional components (e.g. filter components).

The model generator 21 is adapted to provide the modified model for image acquisition, wherein the modified model is based on a physical movement of the x-ray source 100 during x-ray exposure. In contrast to this, state of the art systems are based on the fact that the x-ray tube is stationary during each detector exposure and then moves to the next acquisition angle.

The reconstructor 22 is adapted to perform the algorithm workflow shown in FIG. 3 and explained below and in the description (summary) of the invention. Particularly, it is adapted for iteratively performing an update step for predetermined number of iterations or until convergence is reached.

The storage unit 23 is adapted for storing a data set. The data set may represent a patch P to be reconstructed and may additionally be adapted to also store the reconstructed patch after application of the reconstruction algorithms. The reconstructed patch is generated by reconstructor 22.

Figure 3:
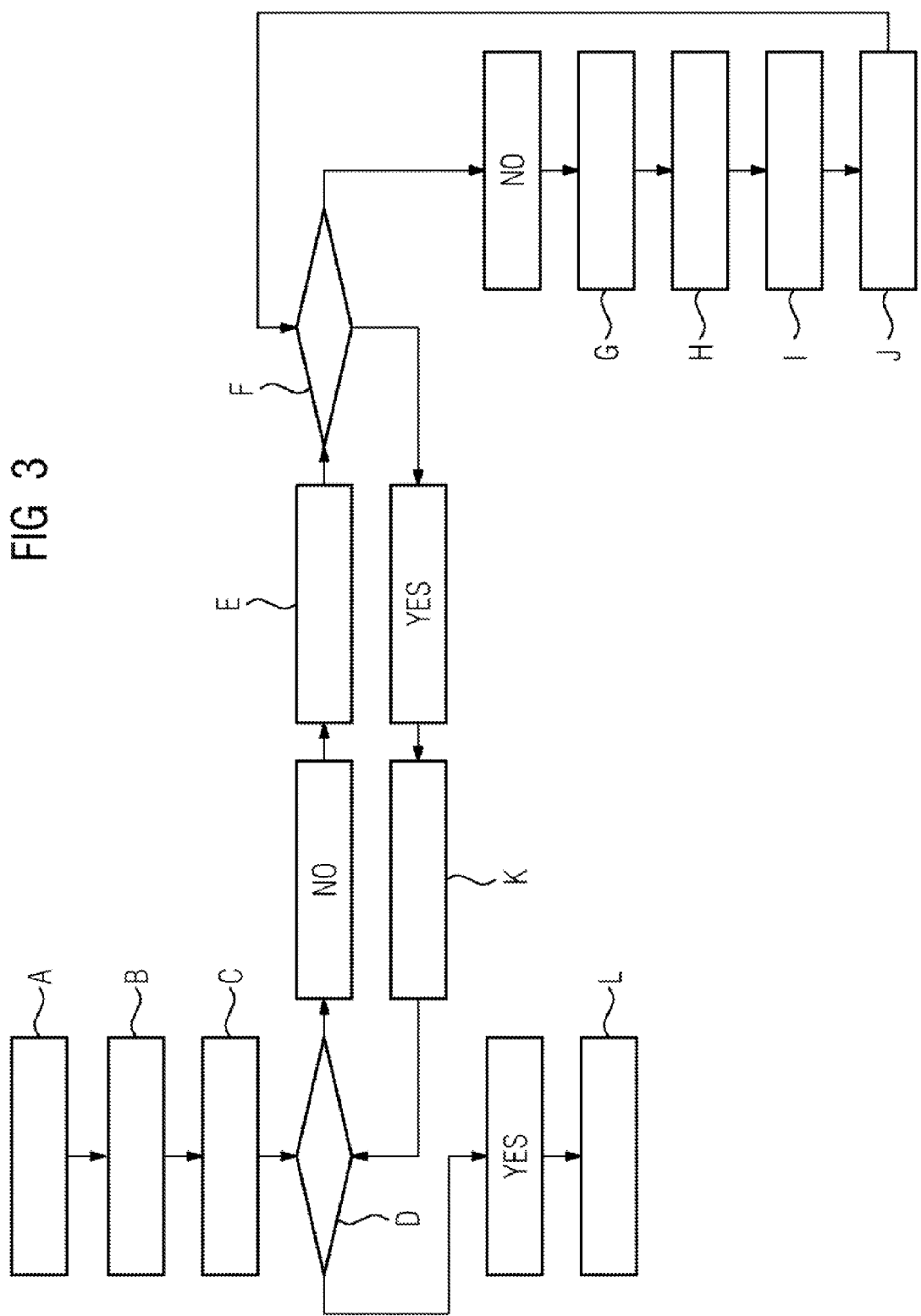
FIG. 3 a workflow for a reconstruction process of present invention according to a preferred embodiment of the same and FIG. 4 a schematic overview of a graphics processing unit with an embedded system according to an embodiment of present invention.

FIG. 3 shows a typical workflow for image reconstruction according to a preferred embodiment of the present invention is shown and explained in more detail below.

Step A: Input of acquired data and all acquisition parameters (compressed breast thickness, tube current, exposure time, or other parameters)

Step B: Initialization of the reconstruction volume. For example: volume with homogeneous attenuation, backprojection of the acquired data, a scaled filtered backprojection of the acquired date or another initialization.

Step C: Start the algorithm with iteration 1.

Step D: Loop of the iterations, stop when a stop condition has been met, for example after a fixed number of iterations is reached or when a certain noise level is reached in the reconstructed volume.

Step E: Determine the order in which the patches will be updated in this iteration. For example: from top to bottom in the $2^{nd}$ iteration, from bottom to top in other iterations.

Step F: Execute the following steps once for each patch.

Step G: Calculate the update step for the current patch. The calculation of this update step can depend on, among other factors:

The data acquisition model that is used to create the cost function. The parameters of this model are read in step A. The model and/or parameters can be different for each patch.

The algorithm that is used to maximize the cost function. For example: gradient ascent algorithm The selected prior function, prior function parameters and prior function weight $\beta$ Step H: Determine the fraction of the update step that is applied to the patch in this instance refers to the fact that additional weights are applied in the first few iterations to properly distribute low frequency information in the direction perpendicular to the detector surface. For example weight $1/(P+1-p)$ in iterations 1 and 2.

Step I: Update the current patch in the reconstruction volume

Step J: Go to the next patch in the order that was determined in step E.

Step K: Calculate the stopping criterion of the algorithm, for example the current iteration number, or the current noise level in the reconstruction so that it can be tested in step D Step L: End of the algorithm. The current volume is considered the result of the reconstruction algorithm.

Generally, the system S is adapted to execute the patchwork reconstruction algorithm as described above. The patchwork reconstruction is based on patches/groups/planes, wherein each patch is parallel to the detector surface. The patchwork reconstruction algorithm is iterative. Generally, the scope of the invention is not limited by a specific ordering (including an ordering of the method steps).

Generally, the reconstruction suggested in this application is characterized by an adapted optimization strategy (in sequential updating) and by a more precise acquisition model that is included in the cost function. The optimization algorithm might be a gradient ascent algorithm, ML convex algorithm or MLTR algorithm.

While the techniques for reconstruction have been discussed in the context of mammography, other fields of medical imaging may also be relevant, like bone or heart examinations. Indeed, the described reconstruction process may be applicable in any situation where the goal is to reconstruct 3-dimensional image information from projection data.

The invention may be susceptible to various modifications and alternative embodiments. Specific embodiments have been shown by way of example in the above detailed description of the drawings. However, it should be understood that the invention is not intended to be limited to these particular forms disclosed herein. Rather, the invention is to cover all modifications, equivalents and alternatives falling within the spirit and scope of the invention as defined by the following appended claims.

The following is a list of reference numerals and symbols used in the specification above:

100 x-ray source
101 detector
200 computer
220 memory
800 controller
801 source controller
802 detector controller
803 acquisition controller
900 monitor
910 printer
920 workstation
S reconstructor
20 receiver
21 model generator
22 reconstructor
23 storage unit
30 co-processor
32 rendering unit
33 control unit
GPU graphics processing unit
P patch
A data acquisition
B initial guess for reconstruction volume
C set iteration nr=1
D last iteration finished?
E Determine the order in which the patches will be updated in this iteration (set patch nr=1 if it=/=2, if it=2, set patch nr to last patch
F all patches finished?
G calculate update for current patch
H weight for update step if iteration nr<x.
I update current guess for reconstruction volume
J Go to the next patch in the order that was determined in step E (patch nr+=1 for it=/=2, patch nr-=1 for it=2)
K create stop criterion iteration nr+=1
L current reconstruction volume is the result

The invention claimed is:

1. A method for digitally reconstructing a three-dimensional tomosynthesis image of a patient's body part, the method which comprises:
receiving signals of a tomosynthesis image system, wherein x-ray radiation is sent by an x-ray source to be received at a detector and the radiation is attenuated by the patient's body part;
splitting the reconstruction volume into a plurality of patches, wherein the patches are parallel to a surface of the detector;
providing a model of image acquisition, where the model may be different for each patch;
applying the model to a cost function and determining an update formula for each patch using an iterative optimization algorithm to maximize the cost function; and
updating each patch separately and sequentially with the update formula to provide an updated patch.

2. The method according to claim 1, wherein the model is based on positional data referring to a physical movement of the x-ray source during x-ray emission.

3. The method according to claim 1, wherein the cost function is the Poisson likelihood of the measured signals.

4. The method according to claim 1, which comprises applying only a certain fraction of the calculated update step to the patches during a first few iterations.

5. The method according to claim 1, wherein updating comprises applying a prior function with a weight $\beta$.

6. The method according to claim 5, which comprises adjusting the weight $\beta$ interactively.

7. The method according to claim 5, which comprises manually adjusting the weight $\beta$ by receiving a user's input with respect to a training set of patient images, in order to automatically calculate delta and $\beta$ so that contrast is sufficient and edges are preserved.

8. The method according to claim 5, which comprises adjusting the weight $\beta$ automatically.

9. The method according to claim 5, wherein a noise level for each patch and iteration is estimated in function of breast composition and/or acquisition parameters in order to adjust weight $\beta$ so that a preset target noise level is reached after a predetermined amount of iterations.

10. The method according to claim 5, which comprises calculating the weight $\beta$ separately for each of the patches.

11. The method according to claim 1, which comprises implementing the method steps in a graphics processing unit.

12. A system for digitally reconstructing a three-dimensional tomosynthesis image of a patient's body part, the system comprising:
 a receiver for receiving signals of a tomosynthesis image system, wherein x-ray radiation is emitted from an x-ray source to be received at a detector and the radiation is attenuated by structures of the patient body part;
 a model generator adapted to provide a model for image acquisition;
 a reconstructor adapted for splitting a reconstruction volume into a plurality of patches, wherein the patches are parallel to a surface of the detector;
 a storage unit for storing a dataset, the dataset being an updated patch, wherein the updated patch is generated by carrying out the method according to claim 1.

13. The system according to claim 12, which comprises a monitor for displaying the three-dimensional image.

14. The system according to claim 12, wherein said reconstructor is executed on a graphics processing unit.

15. A non-transitory computer-readable storage medium storing a computer program form and having code for execution of the method according to claim 1, when the instructions are executed on a computer, wherein the computer program is loaded or loadable into a memory or into a graphics processing unit of the computer.

* * * * *